US012613987B2

(12) United States Patent
Thomas et al.

(10) Patent No.: US 12,613,987 B2
(45) Date of Patent: Apr. 28, 2026

(54) DIGITAL FORENSICS ACCESS AND EXTRACTION

(71) Applicant: Magnet Forensics, LLC, Herndon, VA (US)

(72) Inventors: Braden Thomas, Herndon, VA (US); Philip Thrasher, Herndon, VA (US); Joanna Doute, Herndon, VA (US)

(73) Assignee: Magnet Forensics, LLC

( * ) Notice: Subject to any disclaimer, the term of this patent is extended or adjusted under 35 U.S.C. 154(b) by 83 days.

(21) Appl. No.: 18/621,843

(22) Filed: Mar. 29, 2024

(65) Prior Publication Data

US 2024/0330499 A1      Oct. 3, 2024

Related U.S. Application Data

(60) Provisional application No. 63/456,360, filed on Mar. 31, 2023.

(51) Int. Cl.
| | |
|---|---|
| *G06F 15/16* | (2006.01) |
| *G06F 8/61* | (2018.01) |
| *G06F 16/22* | (2019.01) |
| *G06F 21/62* | (2013.01) |

(52) U.S. Cl.
CPC ........... *G06F 21/6218* (2013.01); *G06F 8/61* (2013.01); *G06F 16/2255* (2019.01)

(58) Field of Classification Search
CPC ..... G06F 21/6218; G06F 16/2255; G06F 8/61
See application file for complete search history.

(56) References Cited

U.S. PATENT DOCUMENTS

| | | | |
|---|---|---|---|
| 2007/0283158 A1* | 12/2007 | Danseglio ........ | G11B 20/00086 713/180 |
| 2009/0164522 A1* | 6/2009 | Fahey ..................... | H04L 63/30 |
| 2021/0049264 A1* | 2/2021 | Barrow ................. | G06F 21/552 |

* cited by examiner

*Primary Examiner* — Normin Abedin
(74) *Attorney, Agent, or Firm* — DLA PIPER LLP US; Blake W. Jackson

(57) ABSTRACT

In one example, a system comprises a digital forensic access device executing instructions to install an access agent on a target device and to replace the access agent with an extraction agent after the access agent locates and copies data in the target device into a data structure; and a computing device running an extraction server comprising instructions to store a copy of the data structure in storage and to remove the extraction agent from the target device.

15 Claims, 5 Drawing Sheets

FIGURE 2

Transition Phase
200

Digital Forensic
Access Device
101

Interface
103

Target Device
102

Extraction
Agent
204
105

Post-Extraction Phase
400

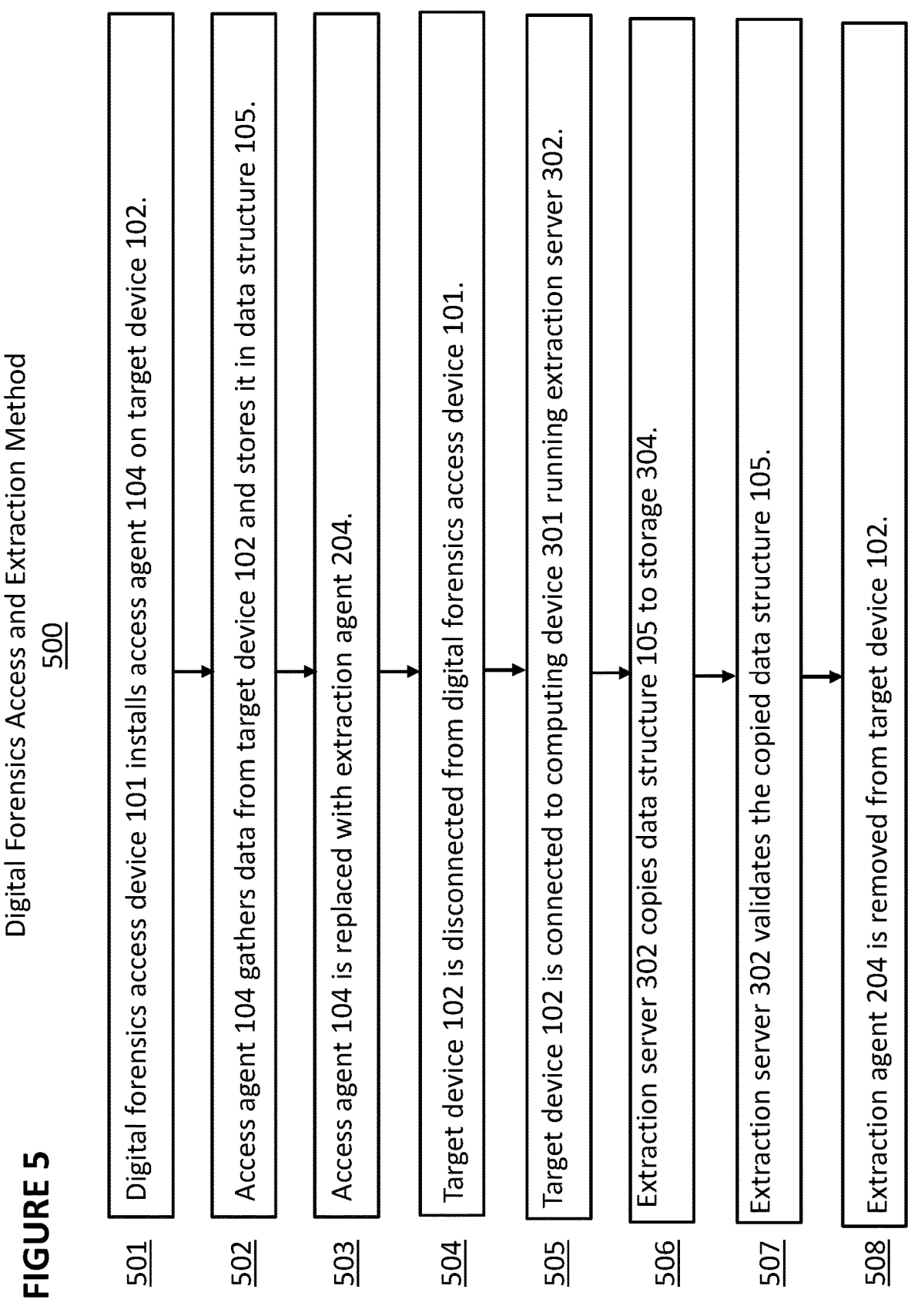

FIGURE 5

Digital Forensics Access and Extraction Method
500

501 | Digital forensics access device 101 installs access agent 104 on target device 102.

502 | Access agent 104 gathers data from target device 102 and stores it in data structure 105.

503 | Access agent 104 is replaced with extraction agent 204.

504 | Target device 102 is disconnected from digital forensics access device 101.

505 | Target device 102 is connected to computing device 301 running extraction server 302.

506 | Extraction server 302 copies data structure 105 to storage 304.

507 | Extraction server 302 validates the copied data structure 105.

508 | Extraction agent 204 is removed from target device 102.

DIGITAL FORENSICS ACCESS AND EXTRACTION

PRIORITY CLAIM

This application claims priority to U.S. Provisional Patent Application No. 63/456,360, filed on Mar. 31, 2023, and titled "Simultaneous Extractions," which is incorporated by reference herein.

FIELD OF THE INVENTION

A system and method for digital forensics access and extraction are disclosed.

BACKGROUND OF THE INVENTION

Law enforcement officials increasingly must perform digital forensics as part of their investigations. For example, law enforcement officials need to analyze the data on the target devices of suspects, witnesses, and other third-parties. Target devices can include phones, tablets, laptops, desktops, servers, wearables, cars, security cameras, and other devices. This sometimes requires extracting and analyzing data from dozens or even hundreds of target devices.

The time required to obtain relevant data from a target device includes the time required to access the data and the time required to extract the data. The time required to access the device can vary depending on the state of the device, the level of access required, and the access methods used. The time required to extract the data depends on the amount of data to copy and the data rate. As the storage space available in mobile devices has increased, the time required to access and extract relevant data has become a significant factor in the total processing time for each target device.

Existing systems utilize a digital forensic access tool that must be connected to the target device for the duration of the access phase and the extraction phase. If the number of target devices exceeds the number of digital forensic access tools, then this process can become very time-consuming and tedious.

What is needed is an improved digital forensics system and method.

SUMMARY OF THE INVENTION

A system and method are disclosed where a digital forensic access device is used during the access phase and a computing device is used during the extraction phase. The computing device optionally can perform extraction simultaneously on a plurality of target devices, thereby reducing the amount of time that the digital forensic access device is connected to each target device, thus improving the overall throughput of the access and extraction process.

BRIEF DESCRIPTION OF THE DRAWINGS

FIG. 2 depicts a transition phase performed by the digital forensic access device.

FIG. 5 depicts a digital forensics access and extraction method.

DETAILED DESCRIPTION OF THE INVENTION

Figure 1:
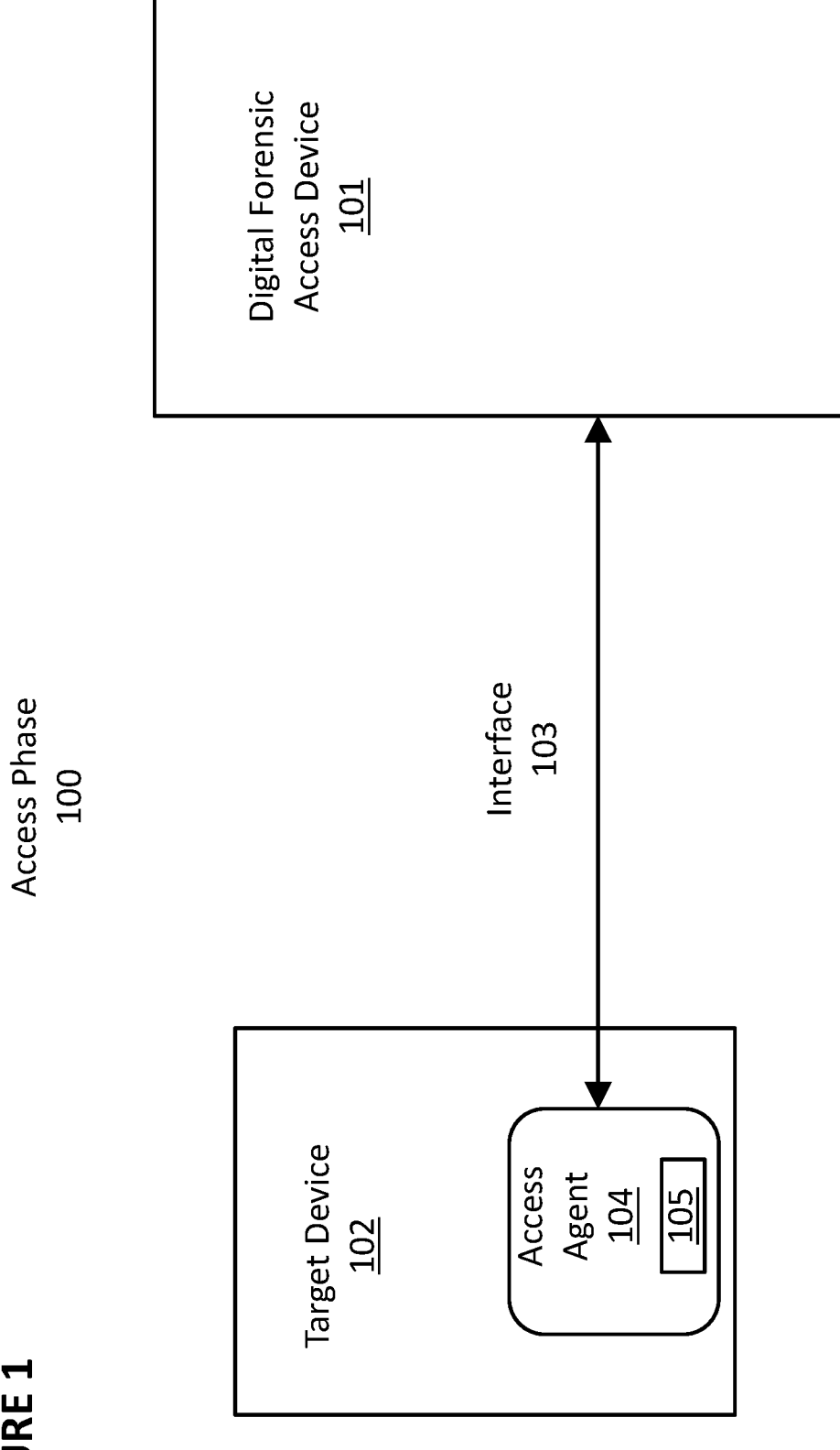
FIG. 1 depicts an access phase performed by a digital forensic access device and an access agent.

FIG. 1 depicts access phase 100 performed by a system. During access phase 100, digital forensic access device 101 is coupled to target device 102 over interface 103. Interface 103 is a wired interface (such as a USB interface, Ethernet interface, or other interface) or a wireless interface (such as an 802.11 interface, and interface known by the trademark BLUETOOTH, or other interface). Digital forensic access device 101 installs access agent 104 in target device 102. Access agent 104 comprises software instructions executable by a processor in target device 102. Access agent 104 may comprise or perform sensitive methods that are protected from malicious actors in part by limiting its exposure solely to target device 102 and digital forensic access device 101. Access agent 104 locates and copies data that is potentially of interest and copies that data in data structure 105. Data structure 105 can comprise a file, a database, or other known structure.

Figure 2:
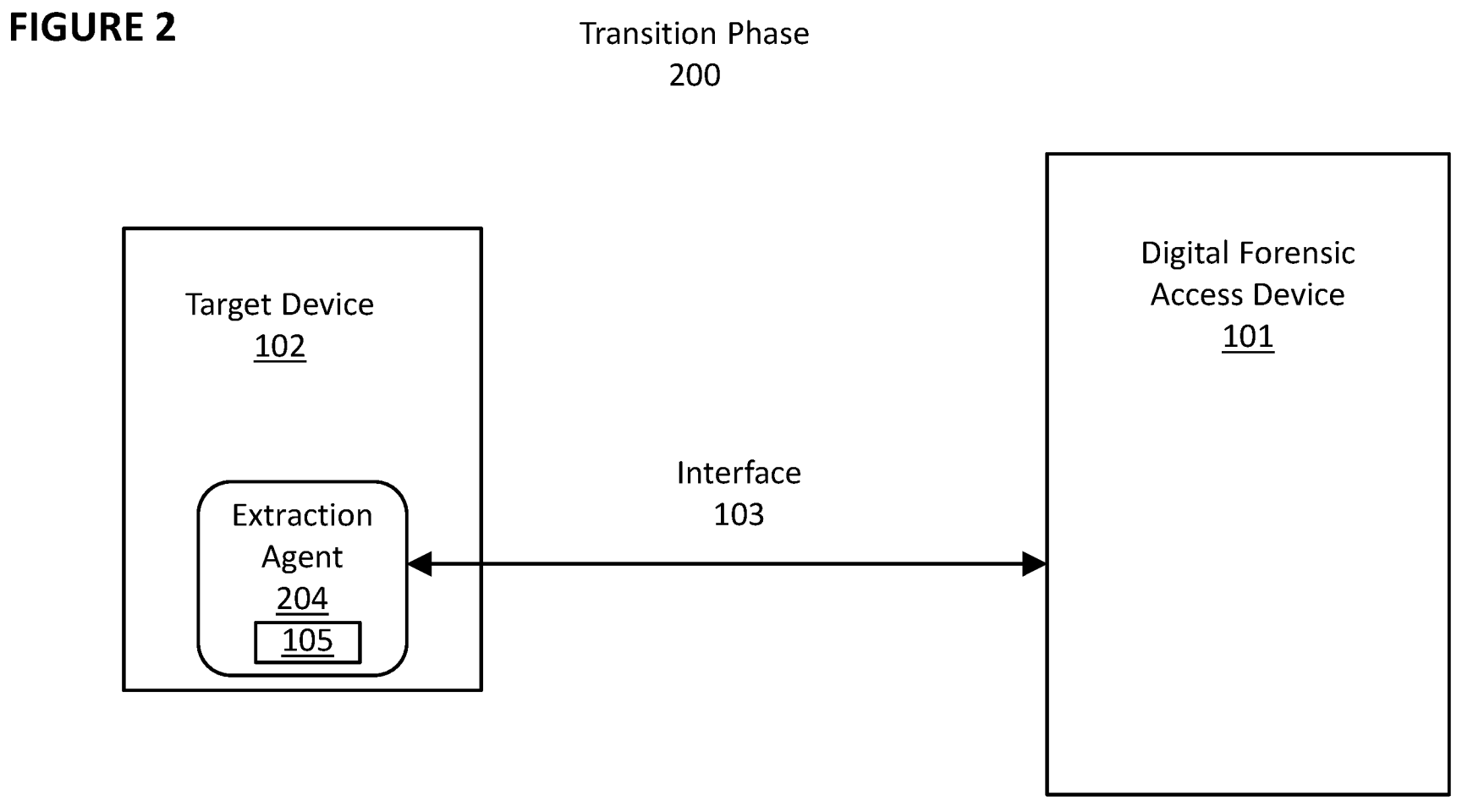

FIG. 2 depicts transition phase 200 performed by the system. During transition phase 200, digital forensic access device 101 optionally replaces access agent 104 (not shown) with extraction agent 204, or alternatively, access agent 104 is transformed into extraction agent 204 (for example, by intentionally deleting or encrypting a portion of its executable code and related files to remove any sensitive methods). Extraction agent 204 comprises software instructions executable by a processor in. target device 102 At the conclusion of transition phase 200, target device 102 is decoupled from digital forensic access device 101, for example, by disconnecting interface 103 if it is a wired interface or terminating interface 103 if it is a wireless interface.

Figure 3:
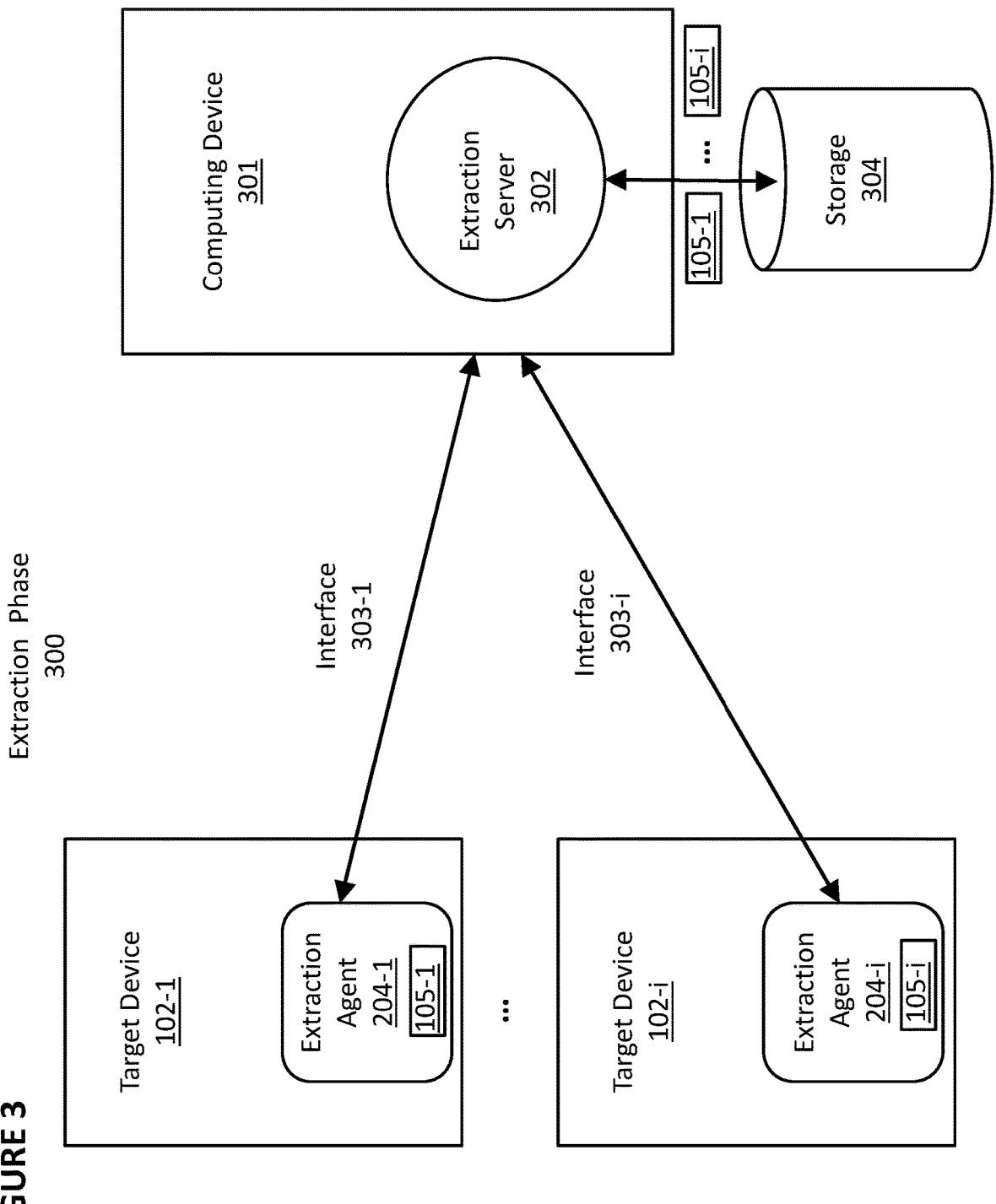
FIG. 3 depicts an extraction phase performed by a computing device and one or more extraction agents.

FIG. 3 depicts extraction phase 300 performed by the system. Target device 102 is connected to computing device 301. Here, a plurality of target devices 102 (target devices 102-1, . . . , 102-i, where i is the number of target devices 102 connected to computing device 301) can be connected simultaneously to computing device 301. Target device 102-1 contains extraction agent 204-1 and data structure 105-1, target device 102-i contains extraction agent 204-i and data structure 105-i, and all other target devices 102 contain respective extraction agents 204 and data structures 105. Target device 102-1 connects to computing device 301 over interface 303-1, target device 102-i connects to computing device 301 over interface 303-i, and all other target devices 102 connect to computing device 301 over respective interfaces 303.

Computing device 301 is a physical server, desktop, laptop, or other computing device. Extraction server 302 comprises software instructions executable by a processor in computing device 301. Interfaces 303-1, . . . , 303-i each is a wired interface (such as a USB interface, Ethernet interface, or other interface) or a wireless interface (such as an 802.11 interface, and interface known by the trademark BLUETOOTH, or other interface).

Extraction server 302 establishes a secure connection with the extraction agents 204-1, . . . , 204-i and copies data structures 105-1, . . . , 105-i to storage 304. Storage 304 can be local storage for computing device 301, external storage (e.g., removable hard drive), Network Attached Storage (NAS), Software as a Service (SaaS) cloud storage, or other storage as specified by an administrator. Extraction server 302 ensures the integrity of the copied data structures 105-1, . . . , 105-i by performing a validation method, for example, by comparing a hash of the copied data structure with a hash of the data structure, where a match means the copy is validated and a mismatch means the copy is not validated and the copy and validation process must be repeated. After the validation has occurred, extraction server 302 deletes extraction agents 204 from target devices 102.

Figure 4:
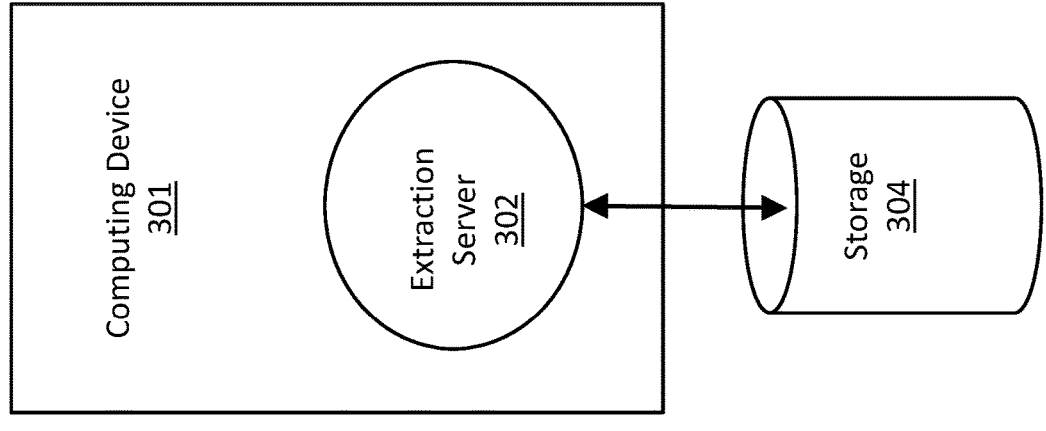
FIG. 4 depicts a post-extraction phase.
Figure 4:
Figure 4:

FIG. 4 depicts post-extraction phase 400 performed by the system. Extraction agents 204 (not shown) have been deleted. Target devices 102 are decoupled from computing device 301, for example, by disconnecting interface 303 if it is a wired interface or terminating interface 303 if it is a wireless interface. A digital forensics examiner may then use various digital forensic tools to analyze the data stored in storage 304.

FIG. 5 depicts digital forensics access and extraction method 500 performed by the system. Digital forensic access device 101 installs access agent 104 on target device 102 (step 501). Access agent 104 gathers data from target device 102 and stores it in data structure 105 (step 502). Access agent 104 is replaced with extraction agent 204 (step 503). Target device 102 is disconnected from digital forensic access device 101 (step 504). Target device 102 is connected to computing device 301 running extraction server 302 (step 505). Extraction server 302 copies data structure 105 to storage 304 (step 506). Extraction server 302 validates the copied data structure 105 (step 507). Extraction agent 204 is removed from target device 102 (step 508). One or more of these steps optionally can be skipped or not performed.

What is claimed is:

1. A system comprising:
a digital forensic access device executing instructions to install an access agent on a target device and to transform the access agent into an extraction agent by encrypting a portion of an executable code and related files of the access agent to remove any sensitive methods that limit exposure of the access agent to the target device, after the access agent locates and copies data in the target device into a data structure; and
a computing device running an extraction server comprising instructions to store a copy of the data structure in storage and to remove the extraction agent from the target device.

2. The system of claim 1, wherein the data structure comprises a file.

3. The system of claim 1, wherein the data structure comprises a database.

4. The system of claim 1 further comprising a first interface to connect the digital forensic access device to the target device.

5. The system of claim 4, wherein the first interface is a wired interface.

6. The system of claim 4, wherein the first interface is a wireless interface.

7. The system of claim 4 further comprising a second interface to connect the computing device to the target device.

8. The system of claim 7, wherein the second interface is a wired interface.

9. The system of claim 7, wherein the second interface is a wireless interface.

10. The system of claim 1, wherein the extraction server comprises instructions to validate the copy of the data structure.

11. The system of claim 10, wherein the instructions to validate the copy of the data structure comprise instructions to compare a hash of the data structure and a hash of the copy of the data structure.

12. A method comprising:
installing, by a digital forensic access device, an access agent on a target device;
gathering data, by the access agent from the target device, and storing the data in a data structure;
transforming the access agent into an extraction agent, wherein transforming comprises encrypting a portion of an executable code and related files of the access agent to remove any sensitive methods that limit exposure of the access agent to the target device;
disconnecting the target device from the digital forensic access device;
connecting the target device to a computing device running an extraction server; and
storing, by the extraction server, a copy of the data structure in storage.

13. The method of claim 12, further comprising:
validating, by the extraction server, the copy of the data structure.

14. The method of claim 13, wherein the validating comprises comparing a hash of the data structure and a hash of the copy of the data structure.

15. The method of claim 12, further comprising:
removing the extraction agent from the target device.

\* \* \* \* \*